April 5, 1966  D. N. GLEW  3,243,966
HYDRATE DECOMPOSITION REFRIGERATION PROCESS
Filed May 7, 1962
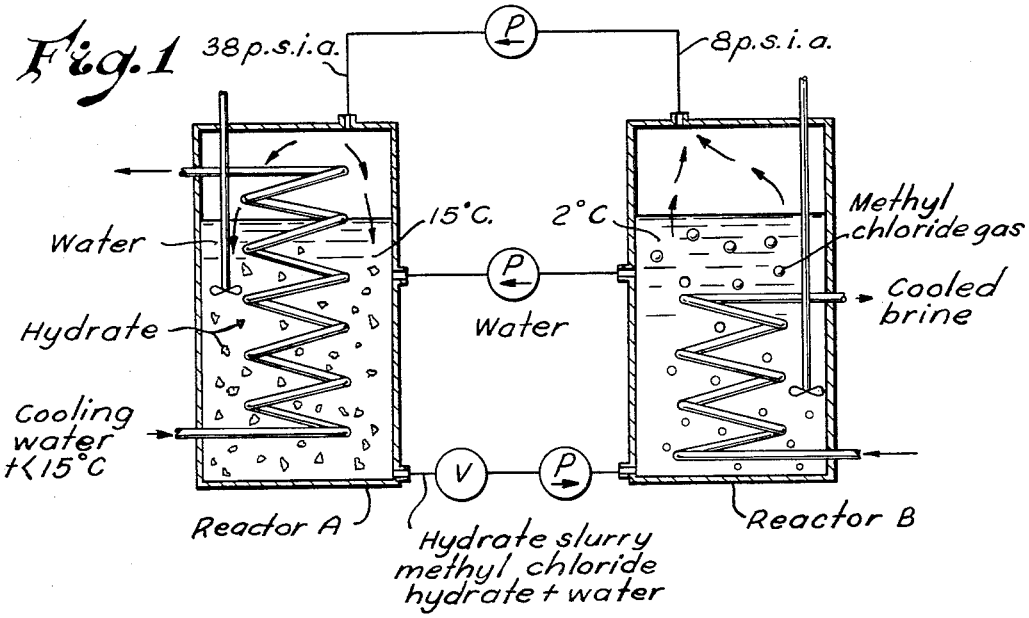
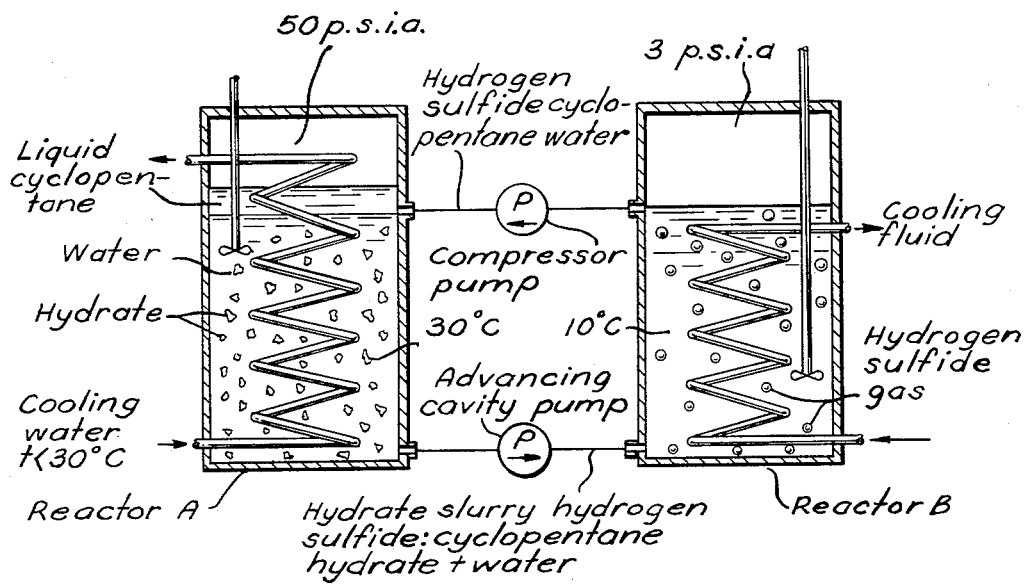
INVENTOR.
David N. Glew
BY
C. Kenneth Bjork
AGENT United States Patent Office 3,243,966
Patented Apr. 5, 1966

3,243,966
HYDRATE DECOMPOSITION REFRIGERATION
PROCESS
David N. Glew, Sarnia, Ontario, Canada, assignor to The
Dow Chemical Company, Midland, Mich., a corporation of Delaware
Filed May 7, 1962, Ser. No. 193,359
8 Claims. (Cl. 62—4)

This invention relates to a refrigeration process and more particularly is concerned with a refrigeration process employing a hydrate forming agent as a refrigerant.

It is a principal object of the present invention to provide a refrigeration process which is not dependent on liquid evaporation for its cooling action.

It is another object of the present invention to provide a refrigeration cycle wherein substantially the same amount of cooling is obtained as in conventional liquid systems using only a relatively small amount of a refrigerant as compared to that used in liquid systems. The term liquid system as used herein means those refrigeration processes wherein the cooling action is dependent on heat extraction by evaporation of a liquid refrigerant.

It is a further object of the present invention to provide an economical refrigeration process for use in large installations wherein any of a wide variety of readily available gaseous materials can be employed as the refrigerant.

Other objects and advantages will become apparent from the detailed description presented hereinafter.

FIGURE 1 shows one embodiment of a refrigeration system of the present invention utilizing methyl chloride.

FIGURE 2 depicts another embodiment of the present refrigeration process employing hydrogen sulfide and cyclopentane.

The instant process comprises, in general, (1) introducing into water, an aqueous solution or a multiphase liquid system having water as one phase a hydrate forming gas which has a solid hydrate form, (2) subjecting the gas-water containing liquid mixture to a minimum pressure and corresponding temperature at which the solid hydrate of the gas is formed thereby forming the solid gas hydrate, (3) decomposing with heat absorption from a heat source to be cooled the solid gas hydrate at a pressure lower than the hydrate forming pressure, and, (4) recompressing the gas, and, (5) recirculating the compressed gas and the aqueous liquid for further hydrate formation.

The term gas as used herein with respect to the solid hydrate formers is meant to include those materials which are in their gaseous state at standard conditions of temperature and pressure, i.e. 0° C. and 760 millimeters mercury. Although these materials ordinarily will be used in this state, it is to be understood that certain of these which can be liquified can be compressed into the liquid state prior to introduction into a reactor wherein the solid hydrate formation is carried out.

The instant novel refrigeration process is illustrated further by the FIGURE 1, wherein a typical gas (methyl chloride) which is capable of forming a solid gas hydrate is compressed and introduced into a closed stirred reactor containing liquid water. The methyl chloride-water mixture is subjected to a pressure exceeding that required for methyl chloride hydrate formation at a temperature at which the hydrate is formed at this predetermined pressure. The heat evolved from this hydrate formation is removed by cooling water passed in closed circuit through the reactor. The solid methyl chloride hydrate settles to the bottom of the reactor. This solid is transferred as a sludge or slurry of water-solid hydrate, by pumping or on a controlled valved cycle into a second reactor which is maintained at a lower pressure than the first reactor, this pressure being less than that at which the solid hydrate is stable. The hydrate in the sludge decomposes in the second reactor absorbing heat energy and lowering the temperature of this reactor. The so-cooled second reactor thereby is used directly as a cooling chamber or can be used to remove sensible heat from brine or other heat transfer material being circulated in a closed circuit through this unit. The methyl chloride gas is removed from the second reactor, recompressed and recycled to the first reactor for further hydrate formation.

The liquid water transferred to the second reactor and that generated by decomposition of the solid hydrate is pumped directly back to the first reactor vessel thereby maintaining predetermined liquid levels in the two separate reactors.

In general the instant process is employed for heat removal over a temperature range of from about 30° C. to about −20° C. The preferred temperature of operation is for the refrigeration temperatures of from about −10 to about +10° C.

The solid hydrate can be transferred to the decomposition vessel (cooling chamber) on a predetermined automatic timed basis wherein the sludge (water-solid hydrate slurry) is pumped through a conduit joining the hydrate forming and hydrate decomposing stages. Ordinarily this transfer is accomplished by a periodic timed valve operation, or by a continuous metering pump of the advancing cavity type or the like, for example.

The maximum concentration of hydrate in the sludge is not critical except that this composition must be of such a consistency so as to be transferrable from the hydrate forming reactor to the decomposition vessel. The minimum concentration of hydrate former to be carried into the decomposition reactor also is not critical except as a limiting factor on the size of reactor to be employed for the decomposition (cooling) cycle. With extremely dilute slurries, the reactor necessarily will be large to achieve the desired amount of cooling. The more concentrated the slurry that is employed the smaller the reactor that can be employed for the hydrate decomposition.

Ordinarily the water-hydrate slurry will contain from about 5 to about 40 and preferably from about 20 to about 30 volume percent of solid hydrate.

If desired a small amount of a surfactant or wetting agent can be added to the mixture in the hydrate forming reactor to facilitate the handling and transfer of the slurry to the hydrate decomposition reactor.

Although ordinarily a connected two reactor apparatus is employed for carrying out the instant process as exemplified by the embodiment shown in the figures, the process can be carried out in a single reactor. For such operations, the hydrate former is introduced into the aqueous liquid containing pressure vessel under hydrate forming pressures and the hydrate formation is carried out. The heat energy evolved is removed from the vessel by a heat transfer medium carried in a separate circuit and removed from the area. After a predetermined length of time, the pressure in the vessel is reduced so that hydrate decomposition takes place thereby cooling the vessel and permitting it to act directly as a refrigerator or to extract heat energy from a heat transfer medium being circulated through it in a closed circuit. The two cycle operation is carried out in a predetermined timed program thereby to maintain an area to be cooled at a given, predetermined reduced temperature.

The maximum temperature for the hydrate forming step of the present invention is that temperature above which a separable hydrate cannot be formed in the presence of a water solution. Preferably, a hydrate former will be selected which may be used at or about room temperature, i.e., from about 20° C. to about 25° C. in order that the hydrate forming process may be run at easily attainable temperatures. Of course, other considerations may dictate the selection of a hydrate former for conditions different from this temperature range. For example, temperatures as low as about minus 10° C. and as high as about 35° C. might be utilized. Lower limits of operating temperatures which can be utilized for the hydrate forming cycle are those temperatures at which ice forms in the aqueous solution being treated. For temperatures below 0° C., aqueous solutions such as sodium chloride, calcium chloride, methyl alcohol, ethylene glycol and the like can be employed instead of water. Use of such solutions also provides a means of maintaining a refrigeration temperature of below 0° C. if such is desired. For those materials which are essentially permanent gases at these temperatures and thus are above their critical temperature, the upper operable temperature is limited only by the pressures attainable in a given system.

Gaseous hydrate formers suitable for use in the process of the present invention may be selected from a wide variety of gaseous inorganic and organic hydrate forming materials, for example, the inert gases, oxygen, nitrogen, halogens, gaseous inorganic hydrides, saturated and unsaturated aliphatic and alicyclic hydrocarbons, gaseous halogenated aliphatic hydrocarbons, gaseous perhalogenocarbons, gaseous inorganic oxides and the like.

Table I which follows lists sources showing experimentally determined pressure-temperature equilibrium line data for a number of useful gaseous hydrate formers in water.

TABLE I

*Pressure-temperature equilibrium line data for hydrate formers and water*

| Hydrate former: | Reference |
|---|---|
| $CO_2$ | Wroblewski, Compt. rend. 94, 212, 954 (1882) |
| $H_2S$ | de Forcrand, Compt. rend. 94, 967 (1882) |
| $PH_3$, $H_2S$ | Cailletet and Bordet, Compt. rend. 95, 58 (1882) |
| $Cl_2$, $Br_2$, $SO_2$ | Roozeboom, Rec. trav. chim. 3, 54 (1884); 4, 65 (1885) |
| $CH_3Cl$ | Villard and de Forcrand, Compt. rend. 106, 1357, 1402 (1882) |
| $CH_4$, $C_2H_6$, $C_2H_4$ | Villard, Compt. rend. 106, 1602 (1882) |
| $N_2O$ | Villard, Compt. rend. 118, 646 (1894) |
| $C_2H_2$ | Villard, Compt. rend. 120, 1262 (1895) |
| A, Kr | de Forcrand, Compt. rend. 176, 355 (1923) |
| Xe | de Forcrand, Compt. rend. 181, 15 (1925) |
| $CH_4$, $C_2H_6$, $C_3H_8$, $CO_2$ | Deaton and Frost, U.S. Bur. Mines Monograph 8 (1946) |
| $C_2H_4$ | Diepen and Scheffer, Rec. trav. chim. 69, 593 (1950) |
| $H_2S$ | Selleck, Carmichael and Sage, Ind. Eng. Chem. 44, 2219 (1950) |
| $CBrClF_2$ | Glew, Can. J. Chem. 38, 208 (1960) |
| $N_2$ | Van Cleeff and Diepen, Rec. trav. chim. 79, 582 (1960) |

The operative limits to be employed for the hydrate forming cycle and the hydrate decomposing cycle are dependent on the properties of the particular gas employed as a hydrate forming refrigerant in a given system and the actual operation conditions therefor readily can be determined for a given system by one skilled in the art.

This instant process provides highly efficient refrigeration markedly improved over conventional liquid refrigeration systems in that only about one-third of the amount of gaseous refrigerant need be handled in the hydrate system to produce the same cooling as in processes utilizing liquid refrigerants. This results since the cooling effect per mole of gas handled in the hydrate system is about 15,000 calories per gram mole while the cooling effect obtained from the evaporating liquid system is only about 5,000 calories per gram mole.

The refrigeration process preferably is carried out in readily available pressure reactors in an integrated batch type operation utilizing a cyclic system.

Readily available pumps, valves, control circuitry, compressors, pressure resistant tubing, etc., as known to one skilled in the refrigeration art can be employed in the instant process.

The following examples will serve to further illustrate the present invention but are not meant to limit it thereto.

EXAMPLE 1

A refrigeration apparatus was set up as shown in FIGURE 1. The hydrate forming reactor (Vessel A) was a closed, pressure reactor equipped with an agitator. Water at a temperature of about 15° C. was placed into the vessel. Compressed methyl chloride was fed from the compressor into the reactor vessel at a minimum pressure of 38 pounds per square inch absolute.

The gaseous methyl chloride reacted with water in the reactor and formed solid methyl chloride hydrate. The heat energy evolved by the hydrate formation was removed by cooling water passed in closed circuit through the reactor.

As the solid methyl chloride hydrate formed, it settled to the bottom of the reactor, concentrating there as a sludge. This sludge, which is a thick slurry of solid methyl chloride hydrate and water, having a solids content of about 20 volume percent, was periodically transferred to a second reactor vessel (B) through a conduit joining the two vessels. The actual transfer of the sludge was controlled by a gate valve automatically operated by an internal timer.

The second reactor was maintained at a low pressure, about 8 pounds per square inch absolute, whereby the hydrate slurry decomposed to liquid water and gaseous methyl chloride taking up heat and thereby lowering the temperature of the reactor and its contents to about 2° C. This reactor was equipped with a closed circuit through which warmed brine from a cooling system was passed. The heat energy was extracted from the brine as it passed through this reactor and the cooled brine recirculated back to the cooling system where it extracted more heat energy. (Alternatively, it is to be understood that the hydrate decomposing reactor vessel itself can be used directly to extract heat from a system or area to be cooled.)

The regenerated methyl chloride gas was removed from the cooling unit, transferred to the compressor, recompressed to a pressure above 38 pounds per square inch absolute and recycled to the reactor (A) for further hydrate formation.

An automatically controlled pump and check valve system was used to recycle water from the sludge and hydrate decomposition back to reactor vessel (A) thereby maintaining a predetermined liquid level in the two reactors. This pump and valve system was designed so that fluids at the higher pressure in the hydrate forming reactor (A) could not pass through this system to the hydrate decomposing reactor (B).

EXAMPLE 2

The process as described for Example 1 was repeated except that temperature conditions in the hydrate forming reactor vessel were maintained at 20° C. and a hydrate forming pressure of at least 68 pounds per square inch absolute was employed. Successful hydrate formation, subsequent hydrate decomposition and cooling of the brine was achieved.

EXAMPLE 3

The refrigeration process described in Example 1 was employed using hydrogen sulfide:tetrahydrofuran hydrate as a refrigerant.

In this operation the gaseous hydrogen sulfide was introduced into the hydrate forming reactor at a pressure of about 27 pounds per square inch absolute into an aqueous solution of tetrahydrofuran, containing about 20 weight percent tetrahydrofuran, at 25° C. This solution contained about 0.5 weight percent of an anionic surfactant, sodium lignin sulfonate, to aid in the handling of the resulting sludge. Solid hydrogen sulfide:tetrahydrofuran hydrate formed with heat evolution, the latent heat released being removed by cooled water circulating through the closed circuit in the reactor. This solid hydrate settled to the bottom of the reactor.

A water-solid hydrate slurry, containing about 25 volume percent of the solid hydrate was metered continuously to the hydrate decomposition reactor where the hydrate was decomposed at about 4 pounds per square inch absolute lowering the liquid temperature in the vessel down to about 10° C. and absorbing heat from a heat transfer fluid circulating through the closed circuit in the vessel.

The hydrogen sulfide gas was returned to the compressor, recompressed to a minimum of 27 pounds per square inch absolute and recycled for additional hydrate formation. Aqueous tetrahydrofuran solution was transferred by pump from the decomposition reactor to the hydrate forming reactor to maintain a predetermined level of solution in these two reactors.

EXAMPLE 4

Methylene fluoride was used as a refrigerant in the refrigeration process of the present invention utilizing an apparatus of the type described in Example 1.

For this embodiment, methylene fluoride was compressed to a pressure of about 150 pounds per square inch absolute and passed into a hydrate forming reactor containing an aqueous sodium chloride solution (about 20 weight percent sodium chloride solute) maintained at about 12° C. Solid methylene fluoride hydrate formed with evolution of heat, which heat was removed by cooling water passing through a separate circuit in this reaction vessel. The solid methylene fluoride hydrate, which settled to the bottom of the reaction vessel, was transferred on a predetermined periodic program to a refrigeration compartment, i.e. a hydrate decomposition reactor, as a slurry having about a 20 volume percent solid content.

This reactor was maintained at about 24 pounds per square inch absolute at which pressure the hydrate decomposed into methylene fluoride and aqueous sodium chloride, taking up heat energy in the process and maintaining this reactor at about minus 4° C.

The methylene fluoride gas was transferred to the compressor, recompressed to about 150 pounds per square inch absolute and recirculated for further hydrate formation. The aqueous sodium chloride solution was continuously recycled to the hydrate forming reactor.

EXAMPLE 5

Using a refrigeration apparatus similar to that described in Example 1, methyl chloride was compressed into the liquid form at about 72 pounds per square inch absolute. This liquid methyl chloride was introduced into the stirred hydrate forming reactor containing water which was maintained at this pressure and at a maximum temperature of about 20.5° C.

The hydrate was transferred as a 15 percent solids containing aqueous slurry to the refrigeration reactor where it was decomposed into gaseous methyl chloride and ice at about 5.5 pounds per square inch absolute and 0° C. The presence of the ice in contact with the liquid water in this reactor maintained this vessel at about 0° C. This reactor is used, for example, directly in a large cold storage area to extract heat energy from the area and provide cooling therein.

The regenerated gaseous methyl chlorine refrigerant was circulated back to the compressor, recompressed to a liquid and again recycled to the hydrate forming reactor.

The water was maintained at a predetermined level in the reactors by controlled pumping from the refrigeration vessel to the hydrate forming reactor.

EXAMPLE 6

The refrigeration process described in Example 1 was employed using hydrogen sulfide: cyclopentane hydrate ($2H_2S \cdot C_5H_{10} \cdot 17H_2O$) as refrigerant and an apparatus shown in FIGURE 2.

In this operation, gaseous hydrogen sulfide was introduced in hydrate forming Reactor A at a pressure of about 50 pounds per square inch absolute into a stirred two phase mixture of liquid cyclopentane and water at 30° C. Solid hydrogen sulfide: cyclopentane hydrate formed with heat evolution, the latent heat released being removed by cooling water circulating through the closed circuit in the reactor. The solid hydrate settled and concentrated at the bottom of the reactor to give a viscous slurry.

The water-solid hydrate slurry containing about 30 volume percent hydrate was continuously pumped and metered through an advancing cavity pump to the hydrate decomposition Reactor B where the hydrate was decomposed at about 3 pounds per square inch absolute pressure with heat absorption from a heat transfer fluid circulating through the closed circuit lowering the liquid temperature down to about 10° C.

The hydrogen sulfide gas, liquid cyclopentane and water were returned together by a liquid piston type rotary blower at 50 pounds per square inch absolute pressure to Reactor A for additional hydrate formation, the liquid-gas compressor maintaining the predetermined liquid levels in the two reactors.

In a manner similar to that described in the foregoing examples the refrigeration process can be carried out by preparing carbon dioxide hydrate at a temperature of about 9° C. and a pressure of about 600 pounds per square inch absolute and subsequently decomposing this hydrate at about 175 pounds per square inch absolute to provide a temperature of about 0° C. thereby maintaining a refrigeration process. Similarly, chlorine hydrate can be formed in a hydrate forming reactor at a pressure of about 85 pounds per square inch absolute and a temperature of about 25° C. and subsequently decomposed at a pressure of about 8.5 pounds per square inch absolute at a temperature of about 5° C. to provide for a refrigeration process. Likewise nitrous oxide ($N_2O$) can be employed as a refrigerant in a hydrate forming-hydrate decomposing refrigeration process.

Various modifications can be made in the present invention without departing from the spirit or scope thereof for it is understood that I limit myself only as defined in the appended claims.

I claim:
1. A refrigeration process which comprises; (1) providing a hydrate forming gas, the hydrate of said gas being a solid, (2) introducing said gas into a vapor space overlying an aqueous liquid for admixture therewith forming a gas-aqueous mixture, (3) subjecting the gas-aqueous mixture to a pressure and temperature at which solid hydrate of said gas forms in the presence of said aqueous liquid and conveying a slurry of said solid hydrate and aqueous liquid to a decomposition chamber, (4) decomposing in said decomposition chamber at a pressure lower than the hydrate forming pressure and with heat absorption from a heat source to be cooled the solid gas hydrate thereby regenerating said hydrate forming gas and said aqueous liquid, (5) recompressing said gas, and (6) recirculating said compressed gas and aqueous liquid for further hydrate formation.

2. A refrigeration process which comprises; (1) introducing a hydrate forming gas into a pressure vessel reactor containing an aqueous liquid, said hydrate forming gas being introduced into a vapor space overlying said aqueous liquid for admixture therewith and forming a gas aqueous mixture, the hydrate of said gas being a solid, (2) subjecting said gas to a pressure and temperature at which the solid hydrate of said gas forms in said liquid, (3) transferring a slurry of said solid hydrate and said aqueous liquid to a second pressure vessel reactor, said second reactor being maintained at a pressure below that at which said solid hydrate is stable, (4) decomposing said hydrate in said second reactor into said hydrate forming gas and said aqueous liquid with absorption of heat energy, (5) extracting by the decomposition of said hydrate heat energy from a heat source to be cooled, (6) transferring the regenerated hydrate forming gas to a compressor, recompressing and recirculating said gas for further solid hydrate formation, and (7) transferring a predetermined quantity of said aqueous liquid to said first reactor thereby maintaining predetermined aqueous liquid levels in the two reactors.

3. A refrigeration process which comprises; (1) introducing gaseous methyl chloride into a first hydrate forming pressure vessel reactor containing liquid water, (2) subjecting the mixture of methyl chloride and water at a maximum temperature of 15° C. to a minimum pressure of 38 pounds per square inch absolute thereby forming solid methyl chloride hydrate and evolving heat energy, (3) removing said heat energy from said reactor, (4) transferring at predetermined intervals a slurry of said solid hydrate and water to a second hydrate decomposing pressure reactor said slurry having a solids content of about 20 volume percent and said second reactor being maintained at a pressure of about 8 pounds per square inch absolute, (5) decomposing the solid hydrate to said gaseous methyl chloride and liquid water in said second reactor and absorbing heat thereby cooling said second reactor and its contents to about 2° C., (6) passing in closed circuit through said second reactor a heated heat exchange fluid from a system to be cooled, (7) absorbing heat energy from said heat transfer fluid in said cooled second reactor, (8) removing said methyl chloride gas from said second reactor, recompressing said gas and recycling said gas to said first pressure vessel reactor for further hydrate formation and (9) transferring a predetermined quantity of said water from said second reactor to said first reactor thereby maintaining a predetermined water level in the two reactors.

4. The process as defined in claim 3 wherein the temperature is maintained at about 20° C. and minimum pressure is 68 pounds per square inch absolute in the hydrate forming reactor.

5. A refrigeration process which comprises (1) introducing gaseous hydrogen sulfide into a first hydrate forming pressure vessel reactor containing an aqueous tetrahydrofuran solution, said solution containing about 20 weight percent tetrahydrofuran, (2) subjecting the mixture of hydrogen sulfide and aqueous tetrahydrofuran solution at a maximum temperature of 25° C. to a minimum pressure of 27 pounds per square inch absolute thereby forming solid hydrogen sulfide:tetrahydrofuran hydrate and evolving heat energy, (3) removing said heat energy from said reactor, (4) transferring at predetermined intervals a slurry of said solid hydrate and aqueous tetrahydrofuran solution to a second pressure vessel reactor said slurry having a solids content of about 25 volume percent and said second reactor being maintained at a pressure of about 4 pounds per square inch absolute, (5) decomposing the solid hydrate to said gaseous hydrogen sulfide and aqueous tetrahydrofuran solution in said second reactor and absorbing heat energy thereby cooling said second reactor and its contents to about 10° C., (6) passing in closed circuit a heated heat exchange fluid from a system to be cooled through said second reactor, (7) absorbing heat energy from said heat transfer fluid in said cooled second reactor, (8) removing said hydrogen sulfide gas from said second reactor, recompressing said gas and recycling said gas to said first pressure vessel reactor for further hydrate formation and (9) transferring a predetermined quantity of said aqueous tetrahydrofuran solution from said second reactor to said first reactor thereby maintaining a predetermined solution level in the two reactors.

6. A refrigeration process which comprises; (1) introducing gaseous methylene fluoride into a first pressure vessel reactor containing an aqueous sodium chloride solution, said solution having a solute content of about 20 percent by weight sodium chloride, (2) subjecting the mixture of methylene fluoride and aqueous sodium chloride solution at a maximum temperature of 12° C. to a minimum pressure of 150 pounds per square inch absolute thereby forming solid methylene fluoride hydrate and evolving heat energy, (3) removing said heat energy from said reactor, (4) transferring at predetermined intervals a slurry of said solid hydrate and aqueous sodium chloride solution to a second pressure vessel reactor said slurry having a solids content of about 20 volume percent and said second reactor being maintained at a pressure of about 24 pounds per square inch absolute, (5) decomposing the solid hydrate to gaseous methylene fluoride and liquid water in said second reactor and absorbing heat energy thereby cooling said second reactor and its contents to about minus 4° C., (6) passing in closed circuit a heated heat exchange fluid from a system to be cooled through said second reactor, (7) absorbing heat energy from said heat transfer fluid in said cooled second reactor, (8) removing said methylene fluoride gas from said second reactor, recompressing said gas and recycling said gas to said first pressure vessel reactor and further hydrate formation and (9) transferring a predetermined quantity of the aqueous sodium chloride solution from said second reactor to said first reactor thereby maintaining a predetermined soluton level in the two reactors.

7. A refrigeration process which comprises; (1) introducing liquid methyl chloride under a minimum pressure of about 72 pounds per square inch absolute into a first pressure vessel reactor containing liquid water, (2) subjecting the mixture of methyl chloride and water at a maximum temperature of about 20° C. to the said pressure thereby forming solid methyl chloride hydrate and evolving heat energy, (3) removing said heat energy from said reactor, (4) transferring at predetermined intervals a slurry of said solid hydrate and water to a second pressure vessel reactor said slurry having a solids content of about 15 volume percent and said second reactor being maintained at a pressure of about 5.5 pounds per square inch absolute, (5) decomposing the solid hydrate to said gaseous methyl chloride and liquid water in said second reactor and absorbing heat thereby cooling said second reactor and its contents to about 0° C., (6) passing in closed circuit a heated heat exchange uuid from a system to be cooled through said second reactor, (7) absorbing heat energy from said heat transfer fluid in said cooled second reactor, (8) removing said methyl chloride gas from said second reactor, recompressing said gas into a liquid and recycling the liquified methyl chloride to said first pressure vessel reactor for further hydrate formation and (9) transferring a predetermined quantity of said water from said second reactor to said first reactor thereby maintaining a predetermined water level in the two reactors.

8. A refrigeration process which comprises; (1) introducing hydrogen sulfide under a minimum pressure of about 50 pounds per square inch absolute into a first pressure vessel reactor containing a two phase mixture of liquid cyclopentane and water, (2) subjecting the hydrogen sulfide-cyclopentane-water mixture at a maximum temperature of about 30° C. to the said pressure thereby forming solid hydrogen sulfide:cyclopentane hydrate and evolving heat energy, (3) removing said heat energy from said reactor, (4) continuously transferring metered quantities of a slurry of said solid hydrate and liquid phases to a second pressure vessel reactor said slurry having a solids content of about 30 volume percent and said second reactor being maintained at a pressure of about 3 pounds per square inch absolute, (5) decomposing the solid hydrate to gaseous hydrogen sulfide and liquid water and liquid cyclopentane in said second reactor absorbing heat energy thereby and cooling said second reactor and its contents to about 10° C., (6) passing in closed circuit a heated heat exchange fluid from a system to be cooled through said second reactor, (7) absorbing heat energy from said heat transfer fluid in said cooled second reactor, (8) removing said gaseous hydrogen sulfide, liquid cyclopentane and water from said second reactor, (9) passing the mixture of gaseous hydrogen sulfide-liquid cyclopentane-water through a liquid piston type rotary blower maintained at about 50 pounds per square inch absolute and returning said mixture to said first reactor for further hydrate formation while maintaining a predetermined liquid level in the two reactors.

References Cited by the Examiner

UNITED STATES PATENTS

| | | | |
|---|---|---|---|
| 1,369,366 | 2/1921 | Thoens | 62—497 |
| 1,659,681 | 2/1928 | Davenport | 62—497 |
| 1,713,934 | 5/1929 | Thoens | 62—497 |
| 1,926,654 | 9/1933 | Scholl | 62—497 |
| 2,307,380 | 1/1943 | Baker | 62—497 |
| 2,904,511 | 9/1959 | Donath. | |
| 2,974,102 | 3/1961 | Williams. | |
| 3,126,334 | 3/1964 | Harlow | 62—58 X |

OTHER REFERENCES

Chem. Eng'g. Progress, vol. 57, pp. 66–71, February 1961.

Chinworth, H. E., and Katz, D. C.: "Refrigerant Hydrates," Refrigeration Engineering, 54 (1947), 359–63.

NORMAN YUDKOFF, *Primary Examiner.*

WILLIAM J. WYE, *Examiner.*